(No Model.)
C. F. R. A. H. & B. L. BAGOT.
DEVICE FOR LOCKING VELOCIPEDES.
No. 564,498. Patented July 21, 1896.
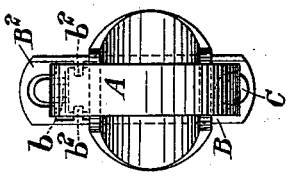
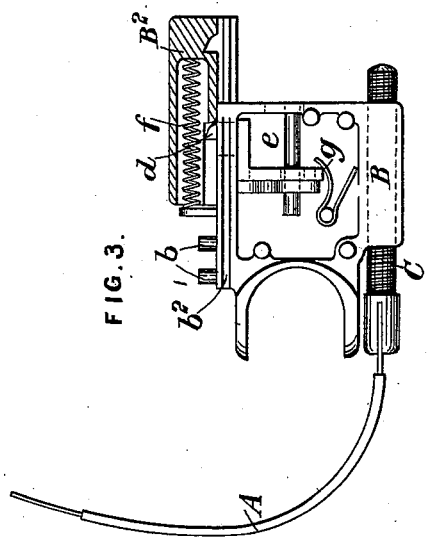
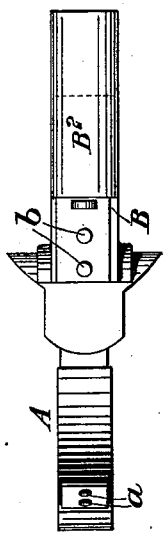
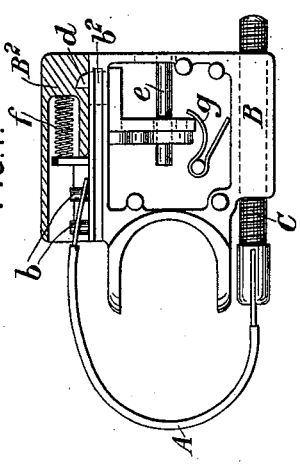
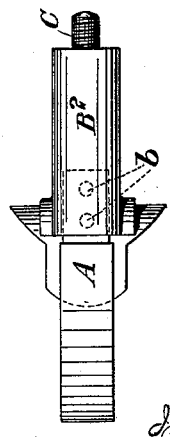
Witnesses:
Inventors
Charles F. R. A. H. Bagot
and
Beatrice L. Bagot
By Howson & Howson
attorneys

UNITED STATES PATENT OFFICE.

CHARLES F. R. A. H. BAGOT AND BEATRICE L. BAGOT, OF LONDON, ENGLAND.

DEVICE FOR LOCKING VELOCIPEDES.

SPECIFICATION forming part of Letters Patent No. 564,498, dated July 21, 1896.

Application filed April 14, 1896. Serial No. 587,525. (No model.)

*To all whom it may concern:*

Be it known that we, CHARLES FITZ ROY ALEXANDER HALLIFAX BAGOT, esquire, and BEATRICE LAURA BAGOT, his wife, subjects of the Queen of Great Britain and Ireland, residing at 59 Cadogan Square, London, England, have invented an Improved Device for Locking Velocipedes and for other Analogous Purposes, of which the following is a specification.

This invention has for its object to provide a strong, simple, and efficient device which can be readily applied to velocipedes or the like in such manner as to prevent their being tampered with or stolen, it being applicable also to other analogous purposes.

The device is intended to inclose and secure together a fixed part of the machine and a moving part thereof, the fixed part being, for instance, in the case of a velocipede, one of the stays and the moving part being the crank-arm, the said arm being, in one position, parallel, or nearly so, with and in convenient proximity to the stay to enable these two parts to be connected together by the said device, so that the crank cannot then be operated.

We will explain this invention with reference to the accompanying drawings.

Figure 1 is a side view, and Fig. 2 an edge view, of the device in its closed position. Figs. 3 and 4 are similar views of the device in its open position, and Fig. 5 is an end view.

The device according to this invention consists of a loop, strap, or chain, but preferably a steel strap A, (we will refer to it as the strap,) the ends of which can be secured together by a locking device, the available length of the strap A being adjustable, which can be conveniently effected by providing it with a screw C at one end, which can be screwed into and out of a screwed hole in the piece B, which contains the locking device and by which the ends of the strap A are connected together. This adjustment enables the strap A to be lengthened and shortened to suit different machines, as the sizes of the parts to be connected and the distances between them vary in different machines. The strap A is preferably covered with leather or other equivalent material to prevent it from scratching the parts against which it bears.

The locking device may be of any suitable description, but it preferably consists of a pin or pins $b$ or projection or projections at the side of the connecting-piece, over which a hole or holes $a$ at one end of the strap A is or are passed, and then a covering-piece $B^2$ is turned or slid over the strap A and pin or pins $b$ or projection or projections to prevent the strap A from being removed therefrom, the said covering-piece being secured by a spring-catch $d$, which can only be released by means of a key provided for the purpose.

$e$ is the post or stem over which the barrel of the key passes.

The part with which the catch $d$ engages may be attached to or formed on the piece $B^2$, which slides between fixed guides $b^2$ in the connecting-piece B. The catch $d$ is pressed forward by a spring $g$, which acts on the said catch to effect the locking, but the said catch can be pressed back, by a suitable key acting thereon as on a latch-bolt, to move the said catch back, when a spring $f$, bearing at one end on a projection from the part B and at the other end on the covering-piece $B^2$, will act on the said covering-piece to move it into its releasing position, or that the strap A can be released from the pin or pins $b$, or the said piece $B^2$ can be moved into that position by hand.

We do not limit ourselves to the precise details shown, as it will be evident that they can be varied without departing from the nature of our invention. For example, the mechanism of the lock may be of any suitable description.

Having now particularly described and ascertained the nature of our said invention and in what manner the same is to be performed, we declare that what we claim is—

1. A bicycle-lock consisting of a connecting-piece, and a strap provided with a screw at one end adapted to be screwed into the connecting-piece to adjust the size of the loop to be formed by the strap, and a spring-lock for locking the other end of the strap to the connecting-piece, substantially as set forth.

2. A bicycle-lock consisting of a connecting-piece, a strap secured at one end to the connecting-piece and provided with a perforation at the other end, and a spring-actuated sliding piece on the connecting-piece, the said connecting-piece being provided with a lug to engage the said perforation, and a catch to engage the sliding piece when pushed over the said lug, all substantially as and for the purposes set forth.

In testimony whereof we have signed our names to this specification in the presence of two subscribing witnesses.

C. F. R. A. H. BAGOT.
B. L. BAGOT.

Witnesses:
CHAS. MILLS,
WILLIAM F. UPTON.